United States Patent [19]

Vockler

[11] Patent Number: 5,510,188

[45] Date of Patent: Apr. 23, 1996

[54] CERAMIC-LIKE OPAQUE GLASS

[75] Inventor: Larry D. Vockler, Vancouver, Wash.

[73] Assignee: Industrial Control Development, Inc., Vancouver, Wash.

[21] Appl. No.: 307,333

[22] Filed: Sep. 14, 1994

[51] Int. Cl.$^6$ ............... B32B 3/10; B32B 19/04
[52] U.S. Cl. ............ 428/426; 428/428; 428/432; 428/446; 501/17; 501/18; 106/600; 106/626; 106/631; 106/635
[58] Field of Search ............ 428/428, 432, 428/426, 446; 501/11, 14, 17, 18, 21, 73; 106/600, 626, 635, 602, 631

[56] References Cited

U.S. PATENT DOCUMENTS

| | | | |
|---|---|---|---|
| 4,173,668 | 11/1979 | Hentzett | 428/34 |
| 4,451,312 | 5/1984 | Nolte | 428/324 |
| 4,478,905 | 10/1984 | Neely | 428/324 |
| 4,515,867 | 5/1985 | Bleacher | 428/204 |
| 4,636,439 | 1/1987 | Breininger | 428/428 |
| 4,726,981 | 2/1988 | Dierson | 428/212 |
| 4,975,314 | 12/1990 | Yano | 428/213 |

*Primary Examiner*—Ellis P. Robinson
*Assistant Examiner*—Leonidas J. Jones, III
*Attorney, Agent, or Firm*—Chernoff, Vilhauer, McClung & Stenzel

[57] ABSTRACT

A process of coating a glass substrate with a ceramic-like tough film, as well as the composite product of said process is disclosed. The process comprises forming, by conventional coating methods, a film of an aqueous silicate composition on the surface of a glass substrate. The aqueous silicate composition comprises pigment, aqueous silicate solutions, alkali metal hydroxide, colloidal silica and feldspar. The process is especially useful for rendering architectural grade and automobile glass opaque and decorative.

2 Claims, No Drawings

CERAMIC-LIKE OPAQUE GLASS

BACKGROUND OF THE INVENTION

In recent years there has been increasing use of coated glass in the construction industry, especially in spandrel and interior design applications, since such glass is substantially less expensive than conventional exterior materials such as brick and granite and presents aesthetically appealing design choices for interiors. Metallic coatings have been applied to enhance both the aesthetic appeal and reflectively of such glass, the latter also helping to conserve energy in buildings. Ceramic frit coatings have been used to color and to opacify glass. However, ceramic frit-coated glass has several serious drawbacks. One such drawback is the presence of substantial amounts of lead in the ceramic frit coating composition. Lead, a toxic metal, requires special care in handling during ceramic frit coating processes and, in fact, its use in ceramic frit coating is now prohibited by regulations of the United States Environmental Protection Agency.

Ceramic enamels have also been used for coating automobile glass to render it opaque for ultraviolet (UV) protection of reinforcing materials such as urethane adhesives and for application of shading designs on the glass. However, ceramic enamels require high-temperature curing with a lead-containing flux material. The heavy and toxic metal cadmium is also present in ceramic enamels as pigment and, consequently, the use of ceramic enamels raises environmental concerns.

There is therefore a need in the art for a glass coating that enhances the durability and insulative and decorative properties of architectural grade glass and automobile glass, that can render the same opaque and impart color thereto, and that can withstand the elements, all without adding any hazardous materials to the environment. These needs and others are met by the process and resulting product of the present invention, which is summarized and described in detail below.

SUMMARY OF THE INVENTION

There are two aspects to the present invention. The first aspect provides a process of imparting a durable, non-toxic, water-based, opacifying film to glass, thus rendering it generally more useful in building construction applications and transportation vehicles. The second aspect of the invention provides a novel composite product of the aforementioned process.

The process essentially comprises applying to a glass substrate a thin film of an aqueous silicate composition comprising pigment, aqueous alkaline earth silicate solutions, colloidal silica, alkali metal hydroxide, and feldspar, followed by a two-step curing of the composition. The so-imparted film or coating has been shown to have extremely high adhesion and durability.

DETAILED DESCRIPTION OF THE INVENTION

The Substrate

The coating process of the present invention may be applied to virtually any glass substrate useable in construction, architectural spandrel and vehicle applications. Since the process of the present invention requires elevated temperatures, the glass substrate must be able to withstand such elevated temperatures.

The Coating Composition

The coating composition of the present invention comprises the following components:
(a) pigment;
(b) aqueous sodium silicate solution wherein the weight ratio of $SiO_2$ to $Na_2O$ is approximately 3;
(c) aqueous sodium silicate solution wherein the weight ratio of $SiO_2$ to $Na_2O$ is approximately 2;
(d) aqueous potassium silicate solution wherein the weight ratio of $SiO_2$ to $K_2O$ is approximately 2;
(e) colloidal silica thickening agent;
(f) aqueous alkali metal hydroxide solution; and
(g) feldspar.

The pigment may be of any type of in any form that withstands higher curing temperatures and is compatible with the composition and is capable of rendering the same colored or substantially opaque. Preferred examples are iron oxides, titanium dioxide, zinc oxide, clays, cupric oxides, all in dry or powdered form or in aqueous dispersions. Pigment may be present in the coating composition from 35 wt % to 45 wt %, and preferably 37 to 43 wt %, based upon the entire weight of the coating composition, including water.

There are essentially three types of aqueous silicate solutions used in the coating composition of the present invention.

(1) sodium silicate wherein the weight ratio $SiO_2:Na_2O \approx 3$;

(2) sodium silicate wherein the weight ratio $SiO_2:Na_2O \approx 2$; and (3) sodium silicate wherein the weight ratio $SiO_2:K_2O \approx 2$.

Preferred silicate solutions of these three types, all commercially available from the PQ Corporation of P. O. Box 480, Valley Forge, Pa. 19482 are:

(1) PQ® STIXSO® RR ($SiO_2:Na_2O=3.25$),

PQ® N® ($SiO_2:Na_2O=3.22$),

PQ® E® ($SiO_2:Na_2O=3.22$),

PQ® O® ($SiO_2:Na_2O=3.22$) and

PQ® K® ($SiO_2:Na_2O=2.88$);

(2) PQ® STARSO® ($SiO_2:Na_2O=1.8$) ,

PQ® C® ($SiO_2:Na_2O=2.0$), and PQ® D® ($SiO_2:Na_2O=2.0$); and (3) PQ® KASIL® #6 ($SiO_2:K_2O=2.1$).

Of the first two types, the most preferred are (1) PQ® N® and (2) PQ® STARSO®.

The colloidal silica thickening agent should be present in an amount so as to render the composition sufficiently viscous that accommodates the application method upon application to the glass substrate. The thickening agent is typically present from 0.5 to 3.0 wt %, preferably about 1.0 wt %, based upon the entire weight of the coating composition, including water. A preferred commercially available colloidal silica is AEROSIL® R-972 available from Degussa of Frankfurt, Germany.

The aqueous alkali metal hydroxide solution should be present in fairly concentrated form, i.e., from 30 to 60 wt %, preferably about 50 wt %. Preferred alkali metal hydroxides are NaOH and KOH.

Feldspar, a naturally occurring asbestos-free igneous mineral rock [$(Na, K, Ca)_{1-2}O.Al_2O_3.2-6SiO_2;SiO_2$] is the final component of the coating composition, and is present from 1 to 4 wt %, preferably from 1.5 to 3 wt %, and most preferably about 2 wt %. A preferred commercially available form is "Minspar 4" from K-T Feldspar Corporation of Spruce Pine, N.C. Although feldspar does contain crystalline silica (as quartz), the dust of which is regarded to be carcinogenic, the quartz in feldspar is chemically bound in the silicate composition upon curing, and so is dust-free.

A coating composition according to the present invention may be prepared by combining all of the ingredients in a ball mill and milling the same until an average particle size of 5–9 microns is achieved.

Application of the Coating

The composition may be applied to the glass substrate by conventional coating methods, including, but not limited to, screen printing, roller coating, curtain coating and spraying. Of these, screen printing is preferred. The coating should be applied in a wet film averaging from about 0.25 mil to about 1.25 mil in thickness, preferably about 1 mil.

Curing of the composition, which effectively removes all of the water present, must be done in two stages:

(1) a lower temperature pre-cure; and (2) a higher temperature final cure.

Curing in either or both stages may be done by air, by heat, by microwave radiation or by infrared radiation. Of these, an infrared pre-cure and a high temperature furnace final cure are preferred. The pre-cure is preferably conducted at a temperature of 200° to 300° C. for 3 to 15 minutes, and most preferably at 230° to 290° C. for 5 to 10 minutes. The final cure is preferably conducted at 500° to 760° C. for 3 to 5 minutes, and most preferably at 620° C. for about 5 minutes or 715° C. for about 4 minutes.

EXAMPLE 1

A 6 mm thick pane of float glass was washed with hot water and detergent and allowed to dry. A coating composition was prepared by adding 415 g of black $Cu_2O$ pigment, 23 g "Minspar 4" feldspar, 130 g PQ® N® aqueous sodium silicate solution, 190 g of PQ® STARSO® aqueous sodium silicate solution, 180 g PQ® KASIL® #6 potassium silicate aqueous solution, 10 g of Degussa AEROSIL® R-972 colloidal silica thickening agent, and 52 g of 50 wt % NaOH solution and the composition was milled in a ball mill for 8 hours to an average particle size of 7 microns.

The coating composition so prepared had a final composition as follows:

| component | wt % |
| --- | --- |
| $Cu_2O$ | 41.5 |
| $SiO_2:Na_2O = 3.2$ | 13.0 |
| $SiO_2:Na_2O = 1.8$ | 19.0 |
| $SiO_2:K_2O = 2.1$ | 18.0 |
| colloidal $SiO_2$ | 1.0 |
| 50% NaOH | 5.2 |
| feldspar | 2.3 |

This composition was then applied in a pattern by screen printing apparatus to the glass substrate, then cured in a infrared oven that generated an average temperature of 230° C. for 10 minutes, then finally cured in a high temperature furnace at 620° C. for 5 minutes.

The coated portions of the glass exhibited 0 to 1% transmissible light, rendering it substantially opaque.

Adhesion characteristics of the coating were initially tested by a modified ASTM C794-80 peel adhesion test and proved to be excellent. After 500 hours of accelerated aging in a QUV weatherometer, run in alternating 4-hour cycles of 100% relative humidity at 40° C. and intense ultraviolet light at 60° C., a sample of the silicate-coated glass was colorfast, solid and uncracked, with no adhesion loss.

In another test, another sample of the so-coated glass was exposed to 2500 microwatts of ultraviolet light per square centimeter, 60° C. for 5 months. The coating remained colorfast and uncracked with excellent adhesion.

In addition to the above tests, samples of the so-coated glass were subjected to boiling water for two hours without loss of adhesion.

EXAMPLE 2

The composition of Example 1 was applied in the same manner to a glass substrate, then pre-cured in the same manner, then finally cured in a high temperature furnace at 715° C. for 4 minutes. Samples of the coated glass product were tested as in Example 1, with substantially the same results.

EXAMPLE 3

Substantially the same procedure noted in Example 1 was followed except that the coating composition was white and had the following make-up:

| component | wt % |
| --- | --- |
| $TiO_2$ | 39.0 |
| $SiO_2:Na_2O = 3.2$ | 14.0 |
| $SiO_2:Na_2O = 1.8$ | 21.5 |
| $SiO_2:K_2O = 2.1$ | 17.0 |
| colloidal $SiO_2$ | 1.0 |
| 50% NaOH | 5.2 |
| feldspar | 2.3 |

Samples of the coated glass product also were tested as noted in Example 1, with substantially the same results.

The terms and expressions which have been employed in the foregoing specification are used therein as terms of description and not of limitation, and there is no intention, in the use of such terms and expressions, of excluding equivalents of the features shown and described or portions thereof it being recognized that the scope of the invention is defined and limited only by the claims which follow.

What is claimed is:

1. A composite article comprising a glass substrate coated with a durable and highly adhesive cured silicate film, said film prepared from a composition consisting essentially of the following components in the weight percentages noted:

(a) 37 to 43 wt % high temperature-resistant pigment;

(b) 11 to 16 wt % aqueous sodium silicate solution wherein the weight ratio of $SiO_2$ to $Na_2O$ is approximately 3;

(c) 15 to 24 wt % aqueous sodium silicate solution wherein the weight ratio of $SiO_2$ to $Na_2O$ is approximately 2;

(d) 15 to 20 wt % aqueous potassium silicate solution wherein the weight ratio of $SiO_2$ to $K_2O$ is approximately 2;

(e) 0.5 to 3 wt % colloidal silica;

(f) 3 to 7 wt % aqueous alkali metal hydroxide solution having a concentration of 30–60 wt %; and (g) 1.5 to 3 wt % feldspar.

2. The composite article of claim 1 wherein said high temperature-resistant pigment is selected from the oxides of copper and titanium.

* * * * *

UNITED STATES PATENT AND TRADEMARK OFFICE
CERTIFICATE OF CORRECTION

PATENT NO. : 5,510,188

DATED : April 23, 1996

INVENTOR(S) : Larry Vockler

It is certified that error appears in the above-indentified patent and that said Letters Patent is hereby corrected as shown below:

Col. 1, line 11: delete "reflectively" and insert -- reflectivity --

Col. 2, line 16: delete "of" and insert -- or --.

Col. 3, line 56: delete "a" (2nd occurence) and insert--an--.

Signed and Sealed this

Fifth Day of November, 1996

Attest:

BRUCE LEHMAN

Attesting Officer     Commissioner of Patents and Trademarks